United States Patent [19]
Fujii

[11] Patent Number: 5,105,547
[45] Date of Patent: Apr. 21, 1992

[54] METHOD OF AND APPARATUS FOR MEASURING THE WHEEL ALIGNMENT OF AUTOMOTIVE VEHICLES

[75] Inventor: Hiroshi Fujii, Hiroshima, Japan

[73] Assignee: Mazda Motor Corporation, Hiroshima, Japan

[21] Appl. No.: 733,742

[22] Filed: Jul. 24, 1991

[30] Foreign Application Priority Data

Jul. 24, 1990 [JP] Japan .................. 2-196856

[51] Int. Cl.⁵ .................. G01B 5/255; G01B 11/275
[52] U.S. Cl. .................. 33/203.13; 33/203; 356/155
[58] Field of Search .......... 33/203.12, 203.13, 203.14, 33/286, 203, 203.15, 288, 645; 356/155; 73/117; 211/23, 24; 248/352

[56] References Cited

U.S. PATENT DOCUMENTS

| | | | |
|---|---|---|---|
| 3,520,180 | 7/1970 | Polhemus et al. | 73/117 |
| 3,579,845 | 5/1971 | Hunter et al. | 33/203.13 |
| 3,793,734 | 2/1974 | Merrill | 33/203.13 |
| 3,908,280 | 9/1975 | Murakami et al. | 33/203.13 |
| 4,443,951 | 4/1984 | Elsasser et al. | 33/203.13 |
| 4,679,327 | 7/1987 | Fouchey et al. | 33/203.13 |
| 4,885,846 | 12/1989 | Nemeth et al. | 33/203.13 |
| 4,901,442 | 2/1990 | Fujii | 33/203.13 |

FOREIGN PATENT DOCUMENTS

| | | | |
|---|---|---|---|
| 3040355 | 5/1982 | Fed. Rep. of Germany | 73/117 |
| 0007001 | 1/1978 | Japan | 73/117 |
| 57-53613 | 3/1982 | Japan . | |
| 0100307 | 6/1982 | Japan | 33/288 |
| 2-91370 | 3/1990 | Japan . | |
| 0528474 | 9/1976 | U.S.S.R. | 73/117 |

*Primary Examiner*—Thomas B. Will
*Attorney, Agent, or Firm*—Fleit, Jacobson, Cohn, Price, Holman & Stern

[57] ABSTRACT

A four wheel automotive vehicle is placed in a horizontal plane and is capable of being tilted in a direction perpendicular to a lengthwise direction of the car body. After determining a reference position of each front wheel in a transverse direction, perpendicular to the lengthwise direction of the automotive vehicle, the plane is tilted at an angle proportional to a cant of a road in the transverse direction. While rotating synchronously the front and rear wheels in the same direction as they would rotate when the automotive vehicle moves forward, a toe angle of each rear wheel and a deflection from the reference position of each front wheel, in the transverse direction, are measured. Observing the measurements of toe angle and deflection, the toe angles of the rear wheels are adjusted totally to a desired toe angle until the deflection becomes almost zero. Thereafter, observing the measurements of toe angle, the toe angles of the front wheels are adjusted totally to a desired toe angle.

10 Claims, 5 Drawing Sheets

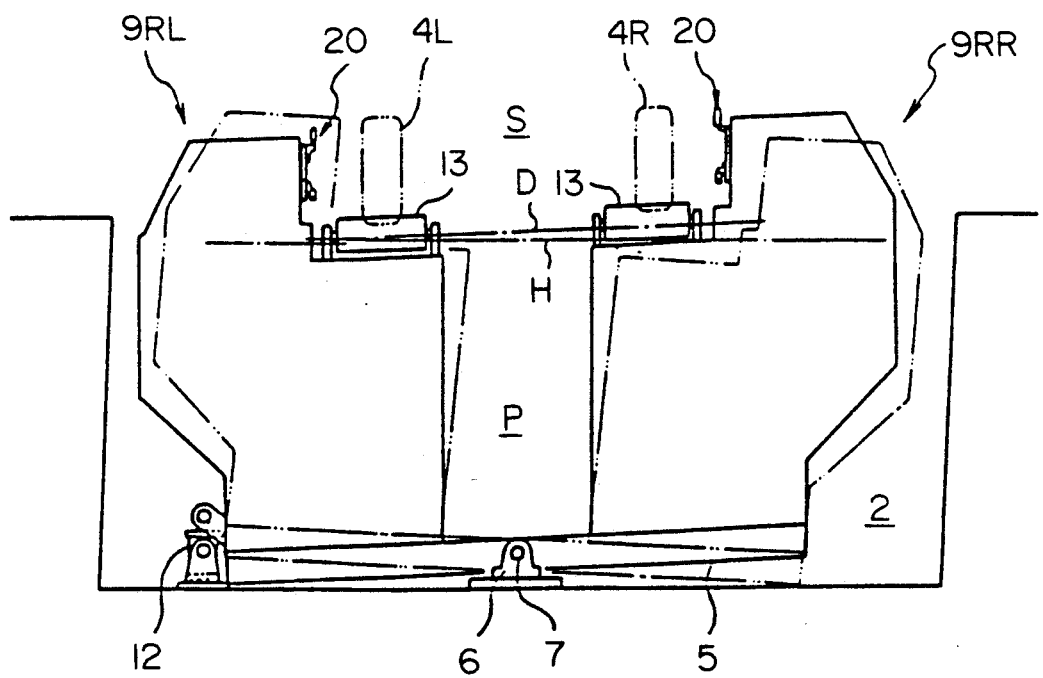

METHOD OF AND APPARATUS FOR MEASURING THE WHEEL ALIGNMENT OF AUTOMOTIVE VEHICLES

The present invention relates to a method of and an apparatus for measuring the wheel alignment of a four wheel automotive vehicle in which the wheel alignment operation is performed while the four wheels of the vehicle are continuously rotated.

BACKGROUND OF THE INVENTION

1. Field of the Invention

To provide easy steering, sure handling, smooth operation and good tire wear, wheel alignment factors, such as caster, camber and toe angles for the front and rear wheels, must be considered. Conventionally, such wheel alignment factors are measured for all four wheels of the vehicle, while the wheels are stopped, in a wheel alignment testing device. The wheel alignment is then desirably adjusted. Such a wheel alignment measuring method and apparatus, however, typically can not provide an automotive vehicle with steering characteristics which are adequately corrected, so that the vehicle travels straight, by adjusting only toe angles of the front and rear wheels, since measurements of the wheel alignment vary, depending upon measuring points of the wheels.

2. Description of Related Art

In recent years, it has become more popular to measure the wheel alignment of automotive vehicles while all the front and rear wheels continuously rotate. The front and rear wheels are supported, in a horizontal plane, by front and rear roller or rotary drum units, driven, respectively, by electric motors. Each roller unit has at least a pair of rollers having horizontal axes of rotation parallel to each other and drives the wheels so as to measure wheel alignment factors, such as camber and toe angles, in a condition which is substantially the same as an actual traveling condition. This allows the wheel alignment factors to be adjusted based on measurements obtained under traveling conditions which approximate actual conditions. Such an apparatus is known from, for instance, Japanese Unexamined Patent Publication No. 57 - 53613. The measurement and adjustment of wheel alignment may alternatively be simultaneously performed while the wheels continuously rotate. Such an apparatus is known from, for instance, Japanese Patent Application No. 2 - 91370, filed by the same applicant as that of this application.

As is well known, roads are designed to have a crown providing an appropriate cant so that water will drain off and be removed from the road surface. Due to such a cant of the road, the automotive vehicle has a lateral weight component which is approximately 2 to 3 per cent of its total weight, which causes an inclination of the automotive vehicle towards that side of the road which is downwardly inclined. For this reason, tires have recently been designed to generate a lateral stress (which is, generally, referred to as a lateral residual stress), approximately equivalent to one fourth (if they are for four wheel vehicles) of the lateral component of weight, at a shoulder portion thereof. Such tires help to keep the automotive vehicle travelling straight forward so that it is almost free from effects provided by the cant of the road.

However, in a conventional wheel alignment apparatus, in which the wheels of an automotive vehicle are disposed in a horizontal plane even though the wheels of the vehicle continuously rotate while measuring the wheel alignment of the automotive vehicle, only the lateral residual stress is reflected in measuring the wheel alignment, and the lateral component of weight of the automotive vehicle is ignored. Accordingly, the toe angles of the wheels tend to be over-corrected if the wheels are adjusted until the tendency of movement of the automotive vehicle towards the left, if the vehicle is a left-hand drive car, or towards the right, if the vehicle is a right-hand drive car, disappears. An automotive vehicle with the toe angles of the wheels thus over-corrected is apt to slide towards the downwardly inclined side of the road due to the lateral component of weight thereof, even though the tires have a proper lateral residual stress, when the vehicle travels on an actual road with a certain cant. The automotive vehicle, therefore, will not properly travel straight.

In order to assure that the automotive vehicle will be stable and travel straight forward, the wheel alignment can be corrected by taking lateral residual stresses of the tires into consideration. However, since tires have lateral residual stresses which are largely different from one another, due to typical manufacturing errors, it is hard to take the lateral residual stresses of the tires into consideration in correcting wheel alignment.

SUMMARY OF THE INVENTION

It is, therefore, a primary object of the invention to provide a method of and an apparatus for measuring and adjusting the wheel alignment of automotive vehicles which can measure the wheel alignment of an automotive vehicle while taking into consideration the cant of a road.

According to the present invention, in a method of measuring the wheel alignment of an automotive vehicle, such as a four wheel automotive vehicle, the automotive vehicle is placed in a horizontal plane capable of tilting in a direction perpendicular to a lengthwise direction of the car body. After determining a reference position of each front wheel in a transverse direction perpendicular to the lengthwise direction of the automotive vehicle, the horizontal plane is tilted or inclined at an angle in the transverse direction. While rotating the front and rear wheels synchronously and in a direction in which the automotive vehicle would be moved forward, a toe angle of each rear wheel and a deflection from the reference point of each front wheel, in the transverse direction, are measured. Observing the measurements, the toe angles of the rear wheels are adjusted totally to a desired toe angle until the deflection becomes almost zero. Thereafter, observing the measurements, the toe angles of the front wheels are adjusted totally to a desired toe angle.

An apparatus for performing the wheel alignment of an automotive vehicle as described above comprises wheel drive means for bearing, or supporting, the automotive vehicle in a horizontal plane and synchronously driving the front and rear wheels in a direction in which the automotive vehicle would be moved forward. The horizontal plane, defined by four pairs of rotary rollers or drums, is tilted or inclined down in the same direction as a cant of a road on which the automotive vehicle travels. The apparatus further comprises deflection sensor means for detecting a lateral deflection of each front wheel during rotation of the front wheel, and toe angle sensor means for detecting a total toe angle of each wheel.

BRIEF DESCRIPTION OF THE DRAWINGS

The above and other objects and features of the present invention will be apparent to those skilled in the art from the following description of a preferred embodiment thereof when considered in conjunction with the accompanying drawings, in which:

FIG. 6 is an explanatory illustration showing the operation of the apparatus shown in FIG. 1.

DETAILED DESCRIPTION OF THE PREFERRED EMBODIMENT

Figure 1:
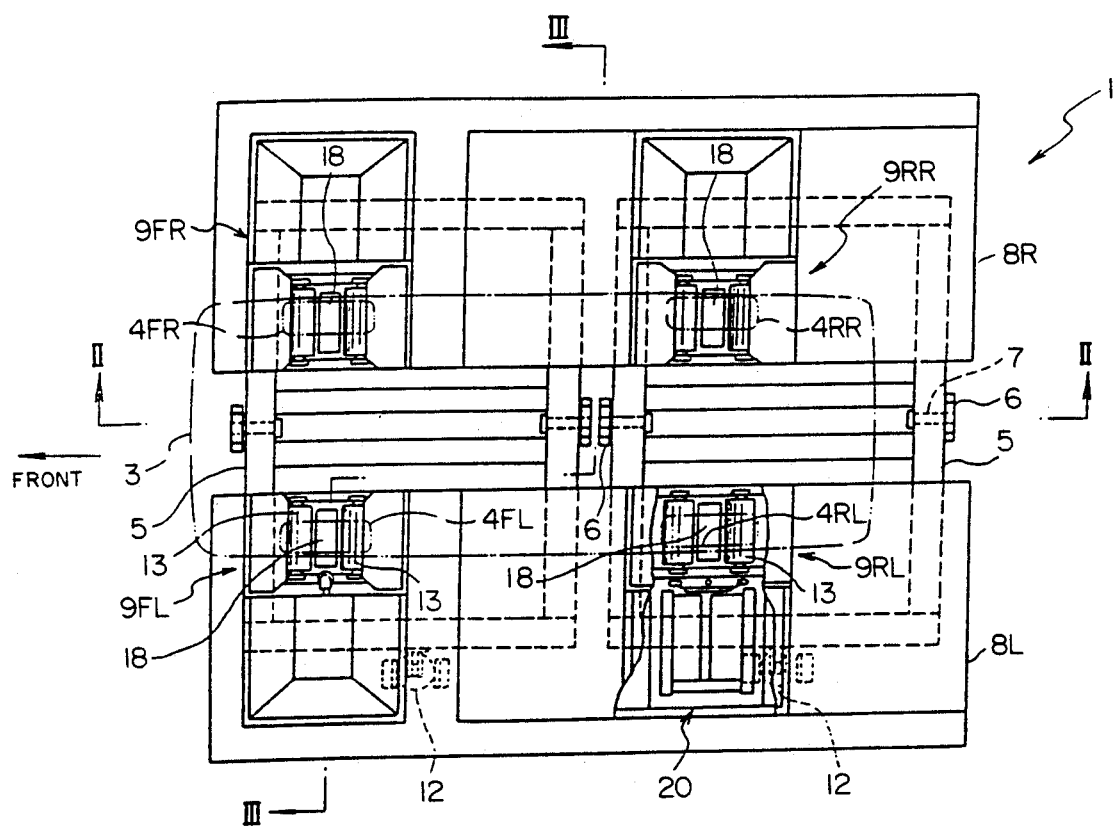
FIG. 1 is a plan view of an apparatus for measuring the wheel alignment of a four wheel automotive vehicle in accordance with a preferred embodiment of the present invention.
Figure 2:
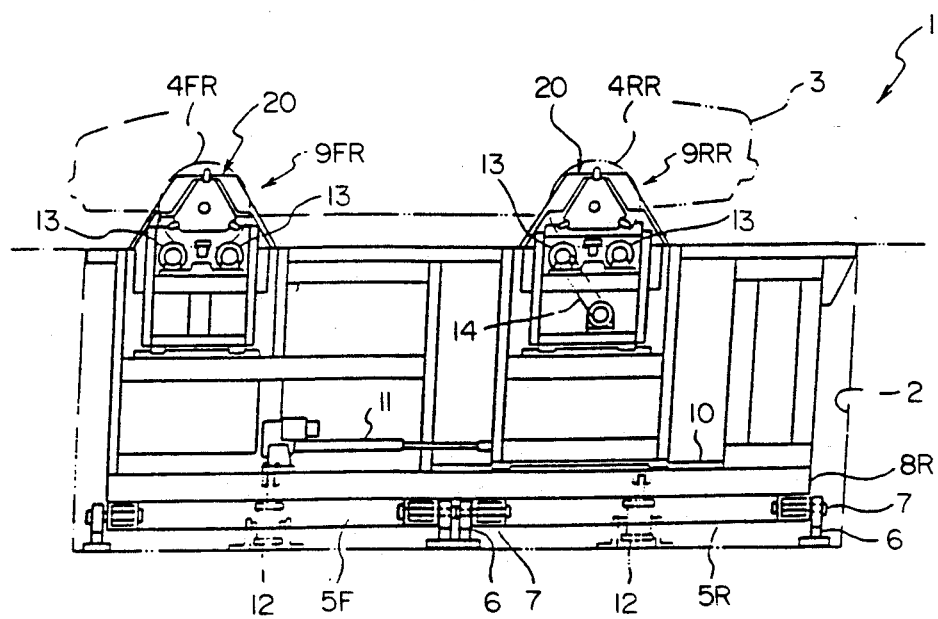
FIG. 2 is a cross sectional view along line II—II of FIG. 1.
Figure 3:
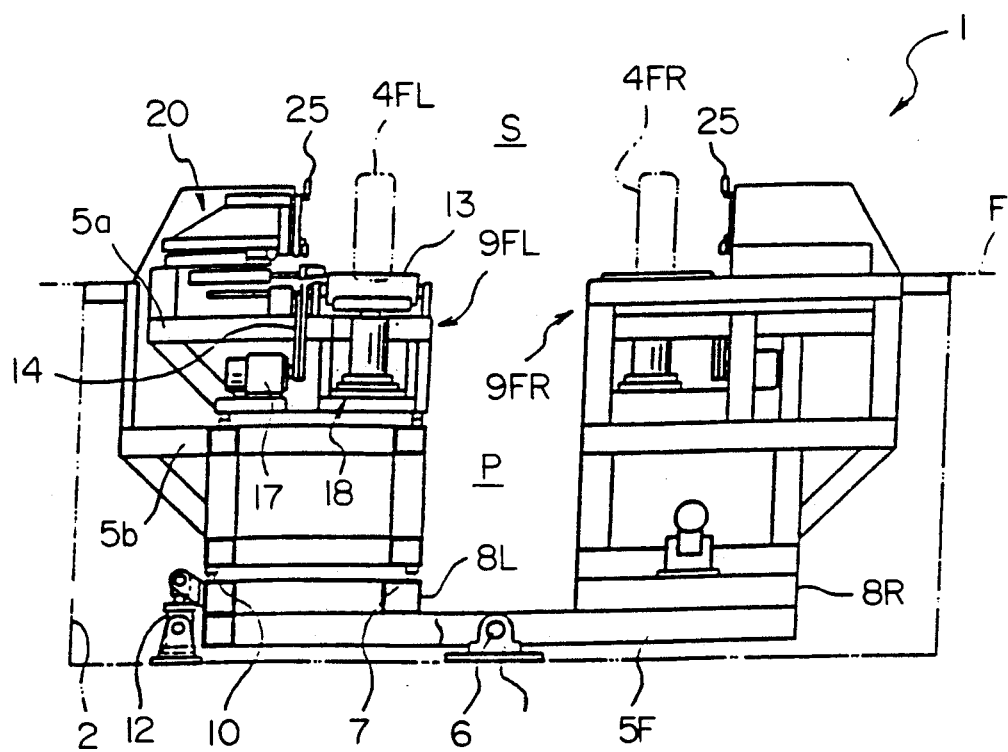
FIG. 3 is a cross sectional view along line III—III of FIG. 2.

Referring to the drawings in detail and, in particular, to FIGS. 1 to 3, a wheel alignment measuring apparatus 1, installed in a fosse 2 at a measuring station S, is shown. A vehicle 3, shown by a phantom line, is lifted from the floor of the measuring station S by a lifter comprising four lifting hands 18 and placed on the top of the wheel alignment measuring apparatus 1.

Wheel alignment measuring apparatus 1 comprises front and rear square base frames 5F and 5R. Each base frame 5F or 5R is supported for oscillation by tilt shafts 7, which are held by brackets 6, respectively, and extend in a straight line in a lengthwise direction of the measuring station S. Over the front and rear base frames 5F and 5R, there are right and left guide frames 8R and 8L, disposed side by side with a certain separation in a direction transverse to the lengthwise direction. The right guide frame 8R is provided with a driving and measuring unit 9 FR for a front right wheel 4FR (shown by a phantom line), which is supported in a stationary manner on a front portion of the right guide frame 8R, and a driving and measuring unit 9 RR for a rear right wheel 4RR (shown by a phantom line), which is supported for movement on a pair of guide rails 10 extending in the transverse direction on a rear half portion of the right guide frame 8R. The left guide frame 8L is provided with a driving and measuring unit 9 FL for a front left wheel 4FL (shown by a phantom line), which is supported for movement on a pair of guide rails 10 extending in the transverse direction in the lengthwise direction on a front half of the left guide frame 8R, and a driving and measuring unit 9 RL for a rear left wheel 4RL (shown by a phantom line), which is supported for movement on a pair of guide rails 10 extending in the transverse direction on a rear half portion of the left guide frame 8L. These driving and measuring units 9FL, 9RR and 9RL are moved, in the lengthwise direction with respect to the guide frames 8R and 8L, by an air operated cylinder 11, relative to the driving and measuring unit 9FR.

An air operated cylinder 12, secured to the bottom of the fosse 2, cooperates with the front base frame 5F so as to place the front base frame 5F in a left tilt position (shown by a solid line in FIG. 6) so that the front base frame 5F inclines at a slope between 0.2 and 0.3 per cent or a right tilt position (shown by a double dot chain line in FIG. 6) so that the front base frame 5F inclines at a slope between 0.2 and 0.3 per cent.

As is shown, in particular, in FIG. 3, there is a working pit P provided between the right and left driving and measuring units so as to allow a worker to adjust the toe angle of the vehicle 3.

Figure 4:
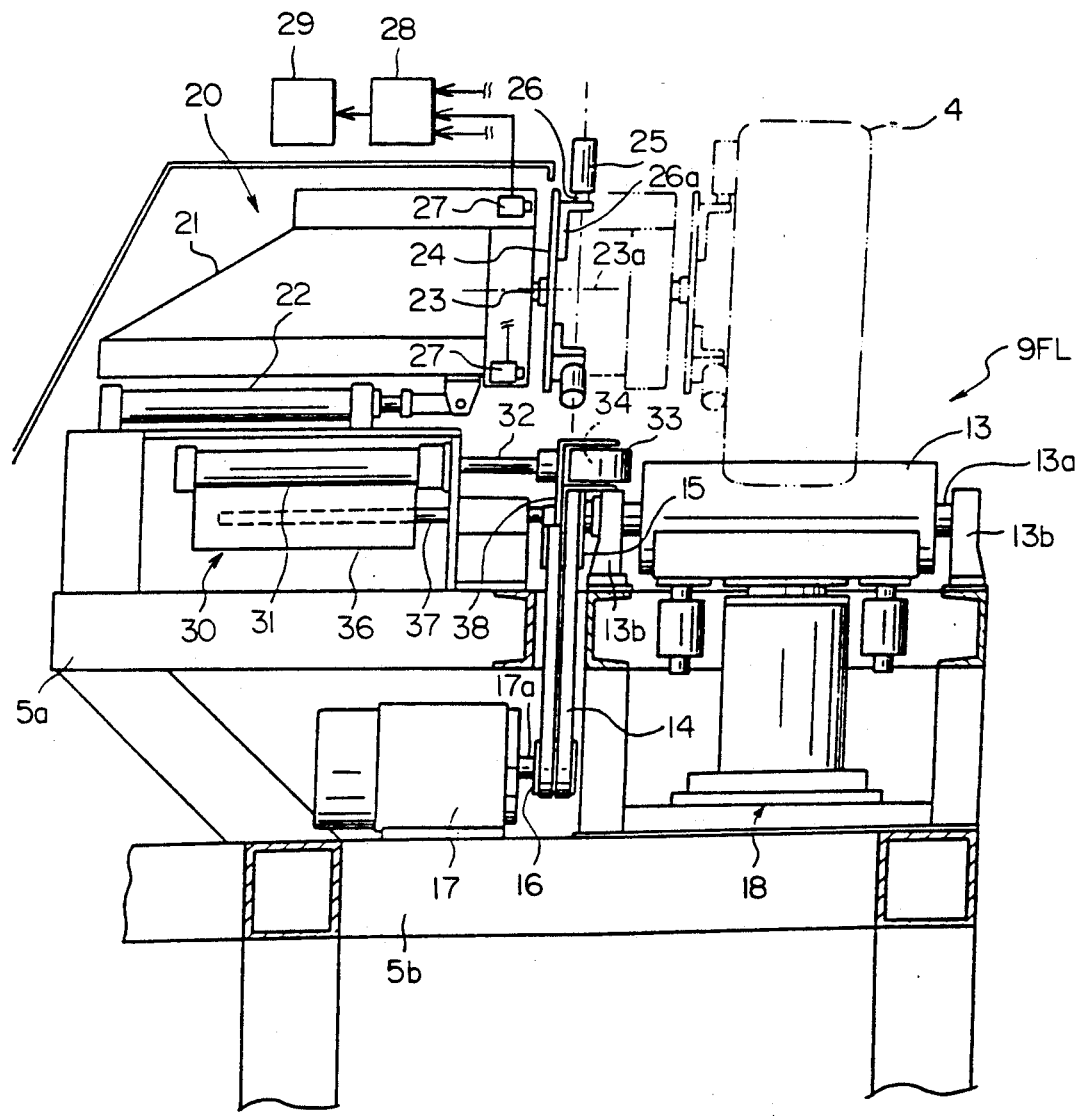
FIG. 4 is a cross sectional view of an essential part of the apparatus shown in FIG. 1.

Because all of the driving and measuring units themselves are identical in structure and operation, the following description is directed primarily to the driving and measuring unit 9FL for the front left wheel 4FL, with reference being made to FIG. 4 in addition to FIGS. 1 to 3. The driving and measuring unit 9FL is provided with a pair of, or front and rear, tester drums 13, arranged in the lengthwise direction, each of which is supported by a shaft 13a, extending in the transverse direction and supported for rotation by the unit. Specifically, the shaft 13a is supported for rotation by brackets 13b mounted on an upper cross frame 5a of the front base frame 5F. The front and rear tester drums 13 have a lengthwise separation so as to snugly receive the front left wheel 4FL thereon. The four pairs of tester rollers 13 for the four vehicle wheels together provide a horizontal plane on which an automotive vehicle is placed for wheel alignment measurement and adjustment. A pulley 15 is coaxially fixed on the end of either, or both, if desired, of the shafts 13a of the front and rear tester drums 13. The pulley 15 is connected or coupled to a pulley 16, coaxially fixed on the end of an output shaft 17a of an electric motor 17, mounted on a lower cross frame 5b of the front base frame 5F, by a V-belt 14 which transmits the motor output to drive the pulley 15, and hence to the tester drum 13. All the electric motors 17 of the driving and measuring units 9FR 9FL, 9RR and 9RL are synchronized in any conventional manner to operate together.

A measuring head 20 for measuring toe and camber angle of the wheels under rotation is disposed on the outer side of the tester drums 13 remote from the working pit P on the top of the driving and measuring unit 9FL. As is shown in FIG. 4, the measuring head 20 is held by a head frame 21. The head frame 21 is supported for transverse movement by an air operated cylinder 22 which positions the measuring head 20 between a rest position, shown by a solid line in FIG. 4, and a working position, shown by a double dot chain line in FIG. 4. The head frame 21 has a stationary shaft 23 projecting therefrom in the transverse direction towards the driving and measuring unit 9FR opposite to the driving and measuring unit 9FL. The stationary shaft 23 extends substantially coaxially with an axis of rotation of the front left wheel 4FL placed on the tester drums 13 of the driving and measuring unit 9FL. A generally triangular measuring plate 24 is held by the end of the stationary shaft 23 so as to incline in any direction with respect to an axis 23a of the stationary shaft 23 but not to turn with respect to the axis 23a of the stationary shaft 23. The measuring plate 24 is provided with three rollers 25 disposed at substantially equal angular positions relative to each other. Each roller 25 is supported for rotation by a shaft 26, held by a bracket 26a, and has a center axis of rotation intersecting the axis 23a of the stationary shaft 23. The rollers 25 can contact an outer side surface of the front left wheel 4FL at three points and are rotated by the front left wheel 4FL when the measuring head 20 is positioned in the working position while the front left wheel 4FL rotates.

Measuring head 20 further has three optical range sensors 27 directed toward the outer surface of the measuring plate 24 and secured to the measuring plate 24 at equal angular positions around the stationary shaft 23. Each range sensor 27 detects a distance between itself and the outer surface of the measuring plate 24 and outputs a signal representative of the detected sensor-to-plate distance. Signals from the three optical range sensors 27 are sent to a processing unit 28. The processor EP, in a known manner, calculates a toe and a camber angle of the front left wheel 4FL, based on the signals. When the measuring head 20 is in the working position, the measuring plate 24 is oriented identically to and, therefore, profiles the outer surface of the front left wheel 4FL through the rollers 25 during the rotation of the front left wheel 4FL. Consequently, the measuring plate 24 has the same toe and camber angle as the front left wheel 4FL. In other words, the measuring plate 24 oscillates about the end of the stationary shaft 23 in an amount corresponding to the toe and camber angle of the front left wheel 4FL. Accordingly, the toe and camber angle of the front left wheel 4FL can be determined from the amount of oscillation of the measuring plate 24 relative to a plane vertical to the axis 23a of the stationary shaft 23. The amount of oscillation is calculated based on the sensor-to-plate distance signals. The resultant toe and camber angle is indicated on a digital display 29. The calculation of toe and camber angle, based on sensor-to-plate distance signals provided from the optical range sensors 27, may be carried out in any well known manner, and the optical range sensor 27 and processing unit 28 may be of an well known type. The digital display 29 may be replaced with an analog display.

Figure 5:
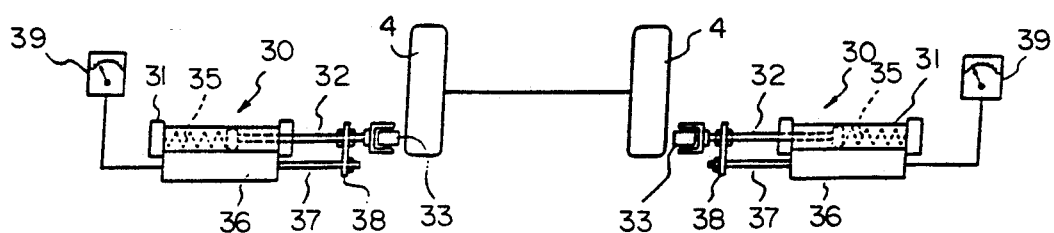
FIG. 5 is an overall schematic illustration of lateral deflection detecting means.

As is shown in detail in FIGS. 4 and 5, the wheel alignment measuring apparatus 1 is further provided with a side slip prevention mechanism 30, installed in each of the driving and measuring units 9FL and 9FR for the front wheels 4FL and 4FR and mounted on the upper cross frame 5a so as to be adjacent to the tester rollers 13. Because both the side slip prevention mechanisms 30 are identical in structure and operation, the following description is directed to the mechanism which is provided for the front left wheel 4FL only. The side slip prevention mechanism 30 comprises a cylindrical hollow holder 31 with a compression spring 35 contained therein. The cylindrical holder 31 supports a spring loaded push rod 32. Push rod 32 extends between the tester rollers 13 of the driving and measuring unit 9FL and is provided with a rebound roller 33, supported for rotation by a vertical shaft 34 at an end of the push rod 32. The spring loaded push rod 32 is allowed to oscillate or slide in the cylindrical holder 31 so as to keep the rebound roller 33 continuously in contact with a lower point of the outer surface of the front left wheel 4FL during rotation of the front left wheel 4FL.

The side slip prevention mechanism 30 further includes a slide detector 36 secured to a lower portion of the cylindrical holder 31. The slide detector 36 has a slide rod 37 which extends parallel to the push rod 32 and is coupled to the push rod 32 by a coupling member 38. Linear sliding of the push rod 32 is detected by the slide rod 37 and is displayed on a linear gauge 39.

The measuring operation of toe and camber angle of the wheel alignment measuring apparatus 1 depicted in FIGS. 1 through 5 will now be described, in detail, with reference to FIG. 6. In a preparatory operation before placing a vehicle to be measured on the wheel alignment measuring apparatus 1, the driving and measuring unit 9FL for the front left wheel 4FL is adjusted, in the lengthwise direction, so as to align the shaft 23a of the measuring head 20 of the driving and measuring unit 9FL for the front left wheel 4FL with the shaft 23a of the measuring head 20 of the driving and measuring unit 9FR for the front rear wheel 4FR. Thereafter, the driving and measuring units 9RL and 9RR for the rear wheels 4RL and 4RR are adjusted in the lengthwise direction so as to make the lengthwise distance between the shafts 23a of the front and rear measuring heads 20 coincide with a wheel base of a vehicle to be measured. A vehicle 3 having a camber angle which has been substantially correctly adjusted previously is placed on the wheel alignment measuring apparatus 1 so as to put front and rear wheels 4FL, 4FR, 4RL and 4RR of the vehicle 3 in position on the pair of tester rollers 13 of the driving and measuring units 9FL, 9FR, 9RL and 9RR, respectively.

After setting the linear gauges 39 (see FIG. 5) to the zero point, maintaining the rebound rollers 33 of the side slip prevention mechanisms 30 in contact with the outer surfaces of the front wheel 4FL and 4FR, respectively, the air operated cylinders 12 are actuated so as to tilt or incline both the front and rear base frames 5F and 5R about the tilt shafts 7, thereby bringing the front and rear base frames 5F and 5R into the left tilt position or the right tilt position. Specifically, the front and rear base frames 5F and 5R are tilted or inclined into the left tilt position if the vehicle is a right-hand drive car and into the right tilt position if the vehicle is a left-hand drive car. Since the vehicle 3 shown as being placed in the wheel alignment measuring apparatus 1 in FIG. 6 is a right-hand drive car, the front and rear base frames 5F and 5R have been tilted or inclined into the left tilt position, shown by a solid line. By tilting the front and rear base frames 5F and 5R, a "virtual" road surface, with a cant between 0.2 and 0.3 per cent, is created by the pairs of tester rollers 13. The cant of the virtual road surface is represented by a slope of a center axis D of the tester roller 13 relative to the horizontal plane H provided by the four pairs of tester rollers 13. This cant is set between 0.2 and 0.3 per cent, and is approximately one tenth the size of a cant of an actual road. This is because the coefficient of friction between the wheels and the tester rollers 13 is considerably smaller than that between the wheel and an actual road surface.

Subsequently, all the electric motors 17 of the driving and measuring units 9FR 9FL, 9RR and 9RL are actuated at the same time and in the same direction (i.e., in a forward direction, in which the vehicle travels straight forward) to rotate the tester roller 13. All the wheels 4FL, 4FR, 4Rl and 4RR of the right-hand drive vehicle on the pairs of tester rollers 13 are turned in the same direction by the synchronously rotating rollers 13. While all the wheels 4FL, 4FR, 4Rl and 4RR turn, the air operated cylinders 22 of the driving and measuring units 9RR and 9RL for the rear wheels 4RL and 4RR are actuated to bring the measuring heads 20 to their working positions and bring the rollers 25 into contact with the outer surfaces of the rear wheels 4RL and 4RR. During the rotation of the rear wheels 4RL and 4RR, the vehicle 3 may possibly slip sideways, either to the right or left, due to an unbalance of toe and camber angles between the rear wheels 4RL and 4RR. However, the side slip prevention mechanisms 30, with their rebound rollers 33 in contact with the outer surfaces of the front wheels 4FL and 4FR, and the measuring heads 20, with their rollers 25 in contact with the outer surfaces of the rear wheels 4RL and 4RR, prevent the front wheels 4FL and 4FR and the rear wheels 4RL and 4RR, respectively, from sliding sideways to a great extent. Therefore, the vehicle 3, although inclining slightly sideways with respect to the lengthwise direction, remains stationary.

From distances to the measuring plate 24 measured by the three optical range sensors 27, the toe angle of each rear wheel 4RL or 4RR is detected. If either one or both of the rear wheels must be adjusted for proper toe angle, toe adjusting cams (not shown) are operated to adjust the toe angles of the rear wheels 4RL or 4RR to the predetermined toe angles. On the other hand, if readings on the linear gauges 39 are not zero, this indicates that the adjusted toe angles of the rear wheels 4Rl and 4RR are not proper for the vehicle 3 to travel in a straight forward direction. Then, the toe angles of the rear wheels 4RL and 4RR are relatively readjusted by the toe-in cams until the readings on the linear gauges 39 become zero.

After completing adjustment of the toe angles of the rear wheels 4RL and 4RR, the air operated cylinders 22 of the driving and measuring units 9FL and 9FR for the front wheels 4FL and 4FR, respectively, are actuated to bring the measuring heads 20 to their working positions so as to bring the rollers 25 into contact with the outer surfaces of the front wheels 4FL and 4FR. In the same manner as for the rear wheels 4RL and 4RR, adjusting screws on tie rods (not shown) are operated to adjust the toe angles of the front wheels 4FL or 4FR to the predetermined toe angles. It is desired to adjust the toe angles so as to provide neutral steer at this stage. If it is hard to adjust the toe angles of the front wheels 4FL or 4FR sufficiently for the vehicle 3 to travel in a straight forward direction, due to excessive unbalance between the camber angles of the front wheels 4FL and 4FR, it is desirable to provide a warning, indicating that the adjustment of the camber angle is wrong.

As is apparent from the above, wheel alignment angles are measured while all of the wheels are rotated on and by the tester drums. Transversely adjacent tester drums, which have center lines that are in alignment with each other, are inclined in the same direction as an actual cant of a road on which the vehicle travels. Therefore, it is possible to balance a lateral residual stress of the tires with a lateral component of weight to which the vehicle is subjected by the inclination of the vehicle and, therefore, compensate for the lateral weight component during the measurement of wheel alignment angles. Accordingly, the measurement of wheel alignment angles is free from any residual lateral force of the tires and is made precisely, so as to adjust the wheel alignment angles exactly.

Even when no lateral residual tire stress exists, the measurement of wheel alignment angles is made precisely under conditions as close as possible to actual traveling conditions of the vehicle, taking into consideration the lateral component of weight of the inclined vehicle and the weight of the vehicle, so as to adjust the wheel alignment angles exactly.

The tester rollers may be lined with rubber or asphalt so as to make the coefficient of friction between the wheels and the tester rollers approximately the same as the coefficient of friction between the wheels and an actual rod surface. In this case, the tester drums are inclined to the same angle as an actual cant of a road on which the vehicle travels in order to perform the measurement of wheel alignment angles under actual traveling conditions of the vehicle. In any case, it is preferred to set the inclination of the tester rollers so that the coefficient of friction between the wheels and the tester rollers is taken into consideration so as to balance a total lateral residual stress of the four tires with a lateral component of force to which the vehicle is subjected, by the inclination of the vehicle and its weight, during the measurement of wheel alignment angles.

The air cylinders for tilting the base frames may be replaced with lifters having a screw shaft, a drive nut and an electric motor or with rack and pinion type lifters so as to variably change the inclination of the tester rollers.

It is to be understood that although the present invention has been fully described with respect to a preferred embodiment thereof, various other embodiments and variants are possible which fall within the scope and spirit of the present invention, and such other embodiments and variants are intended to be covered by the following claims.

What is claimed is:

1. A method of measuring the wheel alignment of an automotive vehicle having a total of four front and rear wheels, comprising the steps of:
   placing the automotive vehicle on a plane which is horizontal;
   determining a reference position of each front wheel in a transverse direction perpendicular to a lengthwise direction of the automotive vehicle;
   inclining said plane, at an angle, in said transverse direction;
   rotating synchronously the front and rear wheels in a direction wherein the automotive vehicle moves forward;
   measuring a toe angle of each of said rear wheels and a deflection of each of said front wheels from a reference point in said transverse direction;
   adjusting totally the toe angles of said rear wheels to a desired toe angle until said deflection becomes almost zero; and
   adjusting totally toe angles of said front wheels to a desired toe angle.

2. A method as recited in claim 1, wherein said plane is inclined downwardly in the same direction as a cant of an actual road.

3. A method as recited in claim 2, wherein said angle at which said plane is inclined is less than a cant of an actual road.

4. A method as recited in claim 1, wherein said plane is defined by four roller units on which said wheels are respectively placed.

5. A method as recited in claim 4, wherein said four roller units are synchronously driven so as to synchronously rotate said front and rear wheels.

6. An apparatus for measuring the wheel alignment of an automotive vehicle having front and rear wheels, comprising:
   wheel drive means for supporting the automotive vehicle in a plane which is horizontal and synchronously driving the front and rear wheels in a direction wherein the automotive vehicle moves forward;
   means for inclining said plane downwardly and in the same direction as a cant of a road on which the automotive vehicle travels;

deflection sensor means for detecting a lateral deflection of each of said front wheels during rotation of each of said front wheels; and toe angle sensor means for detecting a toe angle of each said wheel.

7. An apparatus as recited in claim 6, wherein said wheel drive means comprises a pair of rollers for each said wheel, and further comprising an electric motor for driving at least one of said pair of rollers.

8. An apparatus as recited in claim 6, wherein said deflection sensor means comprises a spring loaded sensing head movable in a transverse direction so as to contact laterally a side surface of each of said front wheels and a linear gauge for detecting a deflection of said spring loaded sensing head.

9. An apparatus as recited in claim 6, wherein said toe angle sensor means comprises a measuring head having a measuring surface which profiles a plane in which an outer surface of each of said wheels turns, distance sensor means for detecting distances of at least three points of said measuring surface therefrom, and calculation means for calculating a toe angle of each of said wheels from said distances.

10. An apparatus as recited in claim 9, wherein said distance sensor means comprises an optical distance sensor.

* * * * *